United States Patent [19]

Ikeuchi et al.

[11] 3,946,403
[45] Mar. 23, 1976

[54] ELECTROSTATIC RECORDER WITH THREE STATE SWITCHING

[75] Inventors: Jun-ichiro Ikeuchi, Tokyo; Teruo Tsutsumi, Machida, Japan

[73] Assignee: Tokyo Shibaura Electric Co., Ltd., Kawasaki, Japan

[22] Filed: June 6, 1974

[21] Appl. No.: 476,796

[30] Foreign Application Priority Data

| | | |
|---|---|---|
| June 13, 1973 | Japan | 48-66598 |
| June 13, 1973 | Japan | 48-66599 |
| Nov. 29, 1973 | Japan | 48-133696 |
| Nov. 29, 1973 | Japan | 48-133698 |
| June 13, 1973 | Japan | 48-69620[U] |
| June 13, 1973 | Japan | 48-72685[U] |

[52] U.S. Cl. ................. 346/74 EE; 178/6.6 A
[51] Int. Cl.² ............. G03G 15/048; G01D 15/06
[58] Field of Search ........ 346/74 EE, 74 ES, 74 EL; 178/6.6 A

[56] References Cited
UNITED STATES PATENTS

| | | | |
|---|---|---|---|
| 3,465,360 | 9/1969 | Hackley | 346/74 E X |
| 3,480,963 | 11/1969 | Stowell | 346/74 E X |
| 3,624,661 | 11/1971 | Shebanow | 346/74 ES |
| 3,732,573 | 5/1973 | Merka | 346/74 E X |
| 3,757,036 | 9/1973 | Libbet et al. | 346/74 E X |

*Primary Examiner*—Bernard Konick
*Assistant Examiner*—Jay P. Lucas
*Attorney, Agent, or Firm*—Oblon, Fisher, Spivak, McClelland & Maier

[57] ABSTRACT

An electrostatic recorder includes first drive pulse generators each for generating high voltage pulses in response to recording signals and second drive pulse generators so driven in turn as to generate high voltage pulses in response to outputs from a ring counter. Outputs from said first drive pulse generators are respectively supplied to recording electrodes via diodes, and outputs from said second drive pulse generators are respectively supplied to the corresponding electrode groups of said recording electrodes via respective resistors connected to the recording electrodes of the electrode groups in a manner corresponding thereto.

11 Claims, 27 Drawing Figures

FIG. 4
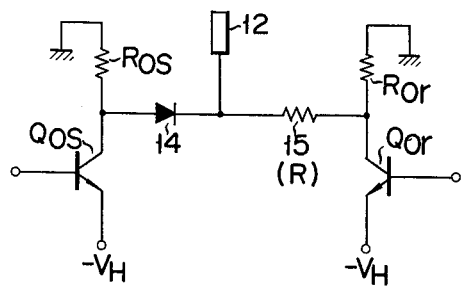
FIG. 5
(a)
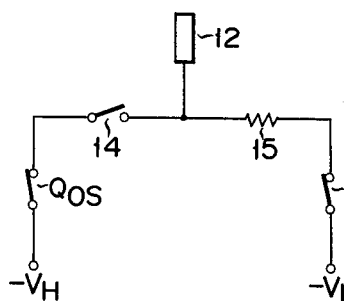
(b)
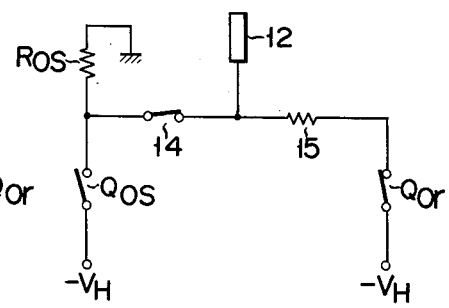
(c)
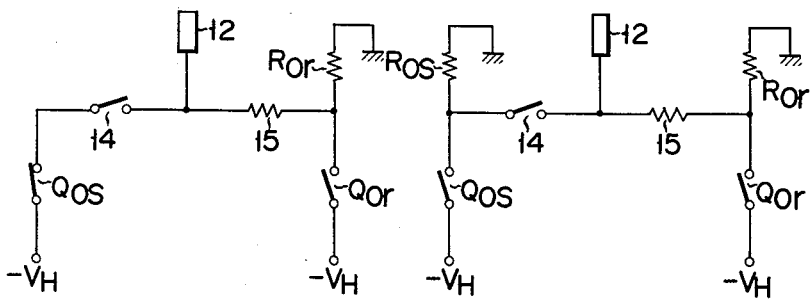
(d)
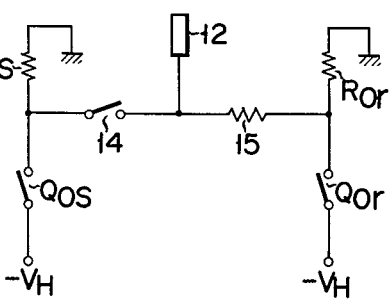

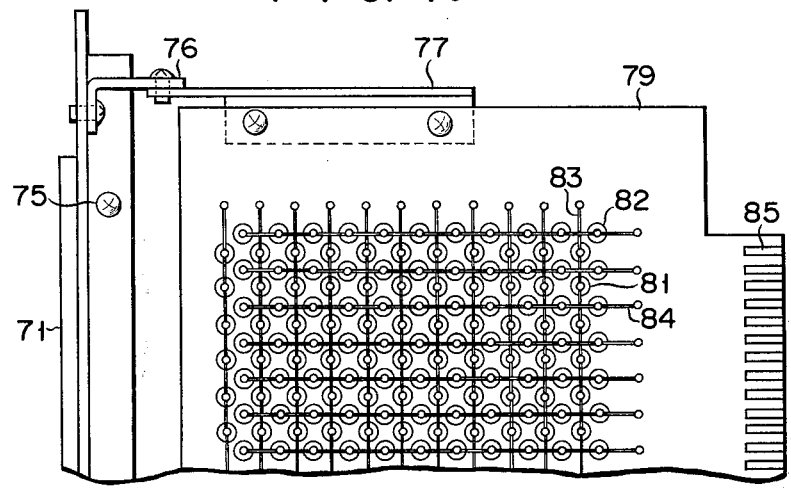
F I G. 19
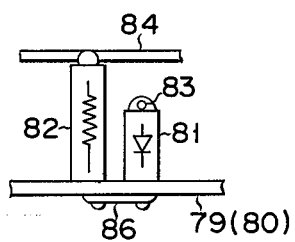
F I G. 20
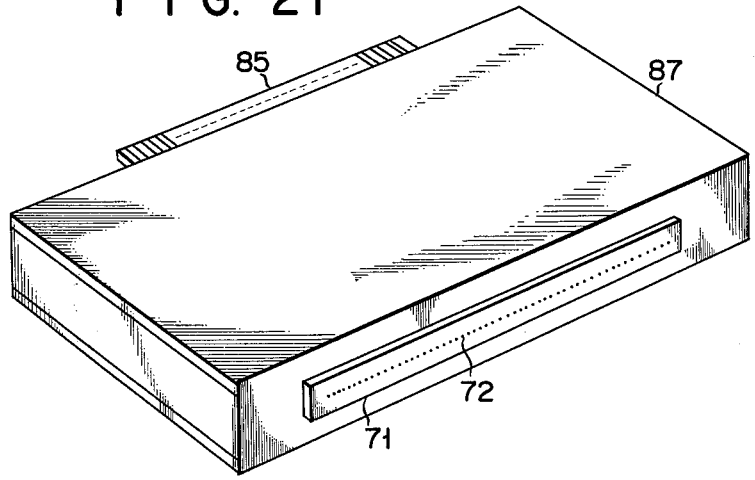
F I G. 21

ELECTROSTATIC RECORDER WITH THREE STATE SWITCHING

This invention relates to an electrostatic recorder, and more particularly to an electrostatic recorder used in the output section of an electronic computer or facsimile apparatus.

In the recent information processing technique mainly based on the utilization of an electronic computer and facsimile apparatus, an electrostatic recorder as information recording means has been widely accepted on account of its high speed performance and multi-capacity with increase in the amount of information and with diversification in the content of information. The electrostatic recorder is so constructed as to bring a recording head into contact with a recording paper coated with an insulation resin and impress high voltage pulses upon the recording electrodes of said recording head to form an electrostatic latent image on the recording paper and render said latent image visual using a toner.

Recording heads for forming the electrostatic latent image include a character electrode, electrostatic recording tube or needle electrode. However, in the case of using the character electrode, limitation is made on the sort of a character capable of being printed. Further, the electrostatic recording tube has the drawbacks that it is expensive and its life is short and a recorder using it becomes bulky. Further, the needle electrode has the problems in respect of its quality which result from recording characters in the form of dots. But in recent years, since the character pattern memory tends to become inexpensive for each bit, it becomes possible to increase bits in number to elevate the reproducibility of printed characters.

The prior art needle electrode type recorder has a plurality of recording needle electrodes aligned in a line which are divided into a plurality of groups each consisting of a prescribed number of recording needle electrodes. Main high voltage pulse generators are commonly connected to the electrodes of all the groups so that high voltage drive pulse generators are respectively connected to the recording needle electrodes of the respective groups. Auxiliary electrodes are respectively provided to face all electrode groups, and auxiliary high voltage pulse generators are respectively connected to said corresponding auxiliary electrodes. With the above-mentioned construction, an electrostatic latent image is formed in accordance with the potential difference between the recording needle electrode and the auxiliary electrode.

The foregoing prior art recorder fails to maintain with precision the positional relationship between the recording electrode and the auxiliary electrode and the recording paper due to the auxiliary electrodes being independently provided therefor, resulting in an unstable recording operation. Further, a voltage to be impressed upon the recording electrode and the auxiliary electrode has a value approximating to a voltage value enabling the electrostatic recording to be effected, so that a slight variation of conditions such as voltge, pulse width, temperature or humidity causes the recording characteristics to be varied, often giving rise to the ghost or fog phenomena on a recorded image.

The object of the invention is to provide an electrostatic recorder made simple in construction and capable of performing high speed-and-stable recording operations and reproducing a high quality recorded image presenting an excellent resolution.

Another object of the invention is to provide an electrostatic recorder wherein the potential difference between the recording electrodes is rendered small to prevent the occurrence of the discharging phenomenon between the recording electrodes, thereby to elongate the life of the recording electrode.

Still another object of the invention is to provide an electrostatic recorder wherein the interval between the recording electrodes can be made small by reducing the potential difference between the recording electrodes, thereby enabling the reproduction of a high quality image having an excellent resolution.

According to the invention, a plurality of recording electrodes aligned in a line are divided into a plurality of electrode groups each consisting of a prescribed number of electrodes. A plurality of first drive pulse generators each for generating high voltage pulses in response to recording signals are respectively connected to the recording electrodes of said respective electrode groups via diodes. A plurality of second drive pulse generators each sequentially operated in response to an output from a ring counter to generate a high voltage pulse are connected to the respective corresponding electrode groups via the corresponding plural resistors. With the aforesaid circuit construction, an electrode group supplied with outputs from both said first and second drive pulse generators causes the formation of an electrostatic latent image on the recording paper.

This invention can be more fully understood from the following detailed description when taken in conjunction with the accompanying drawings, in which:

FIG. 4 is a circuit diagram showing the connection relationship of one recording electrode with first and second drive pulse generators;

Figure 6:
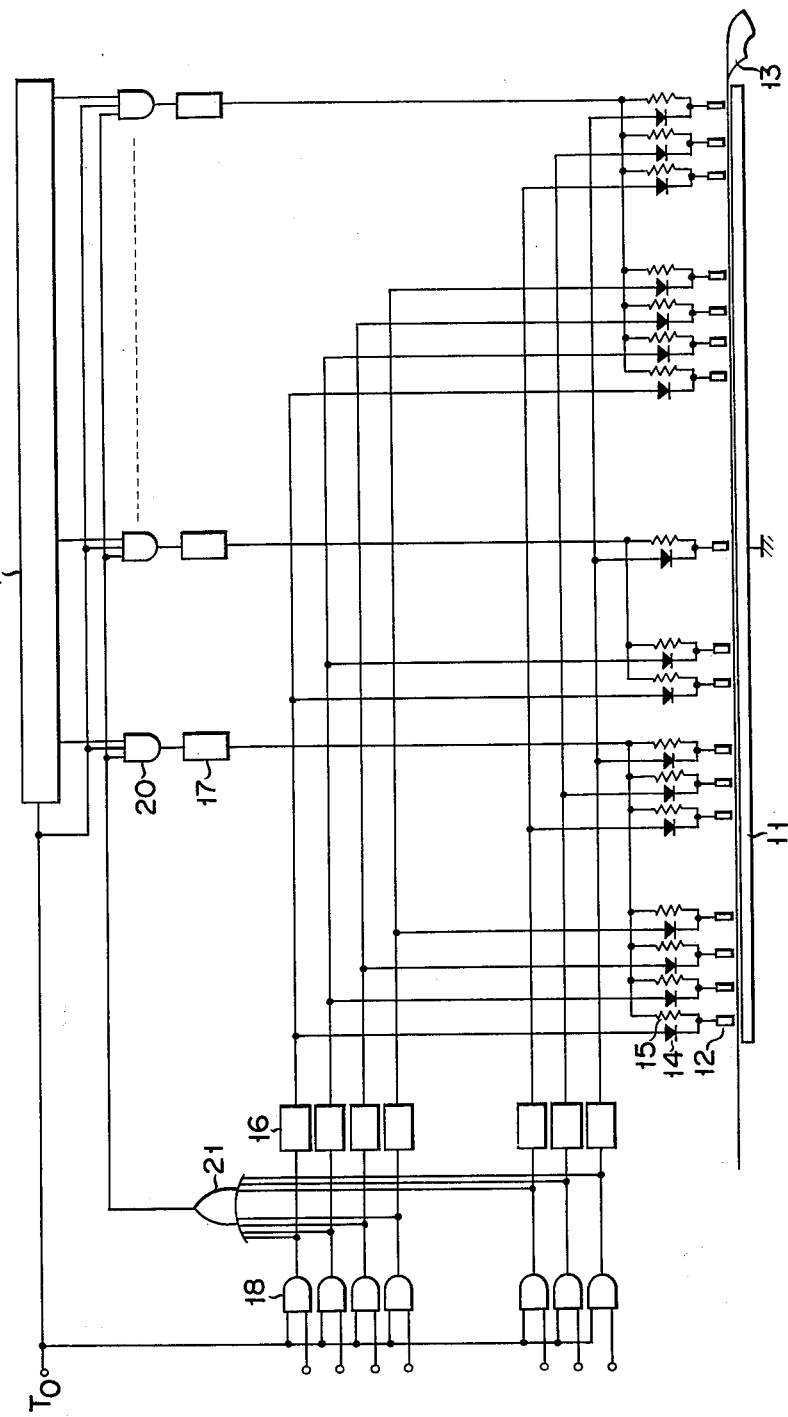
Figure 7:
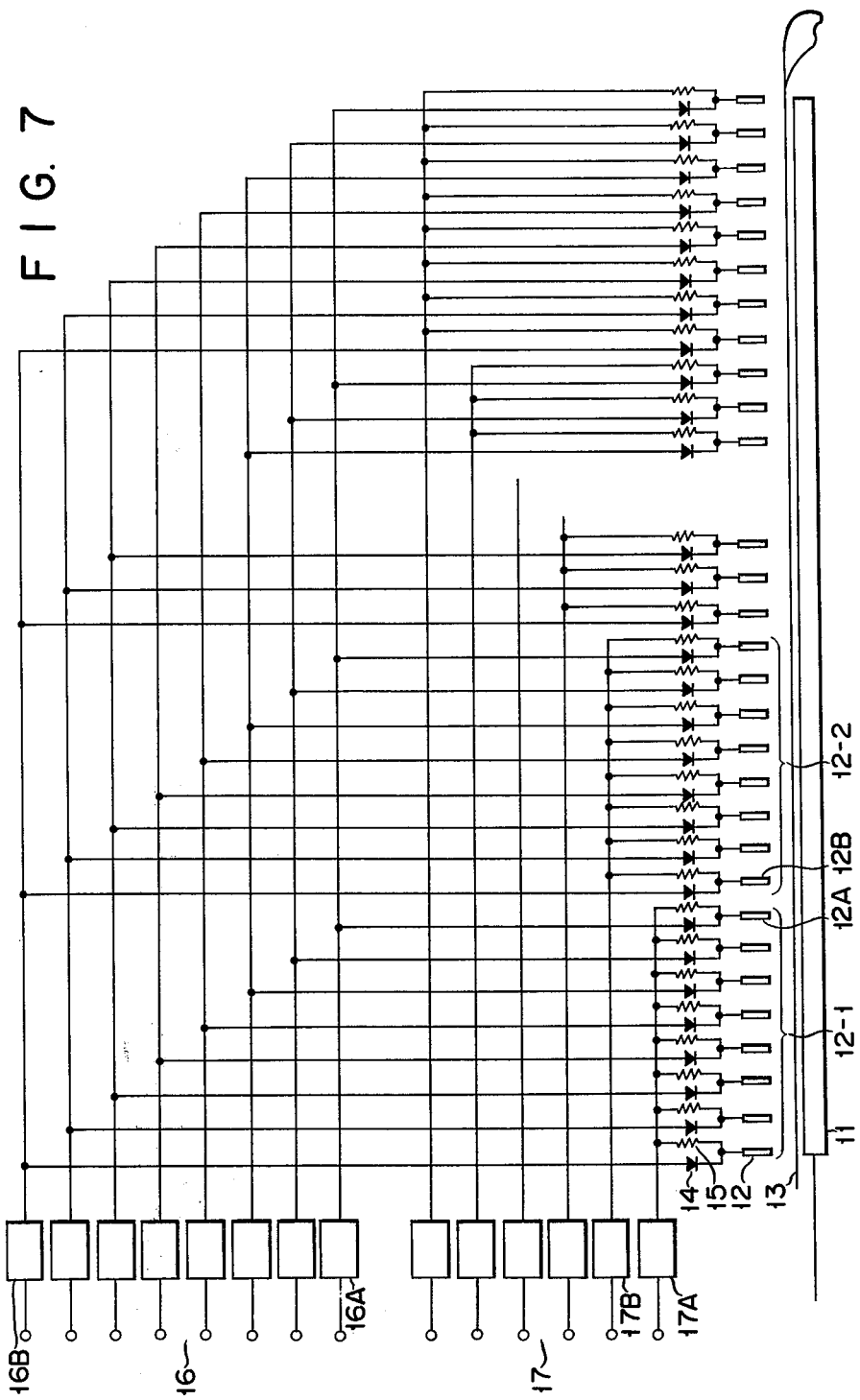
Figure 8:
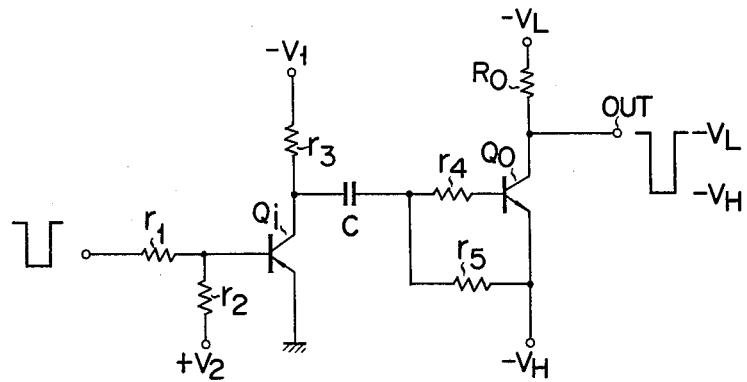
Figure 9:
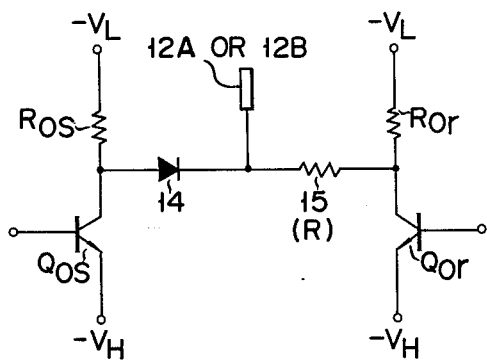
Figure 10:
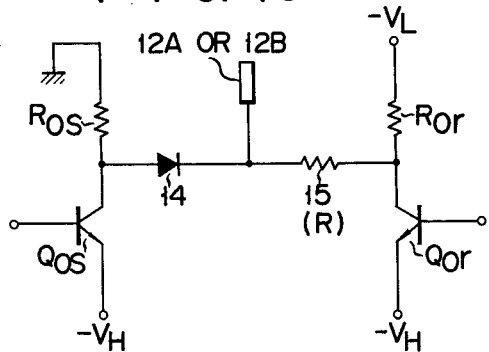
Figure 11:
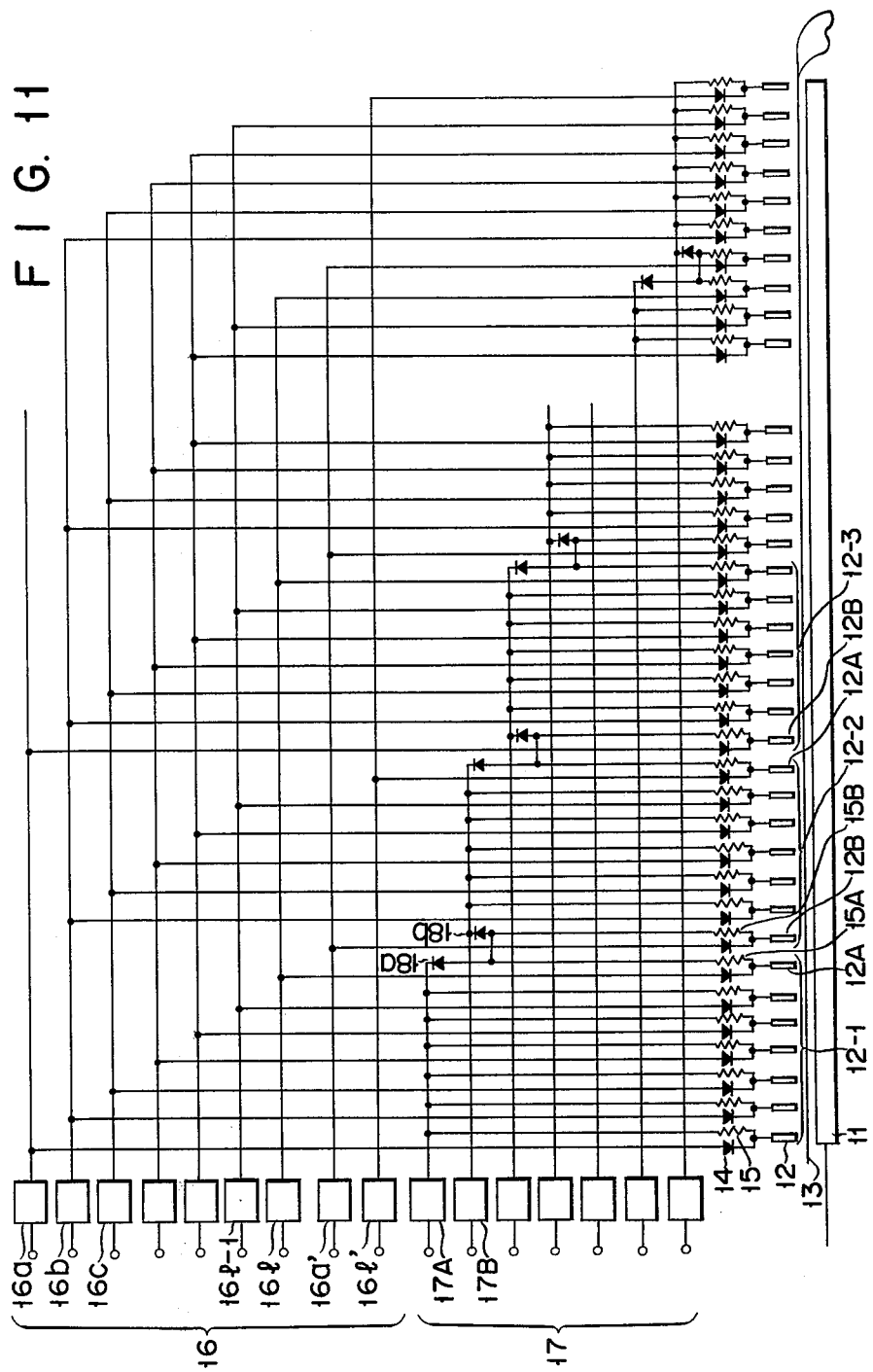
Figure 12:
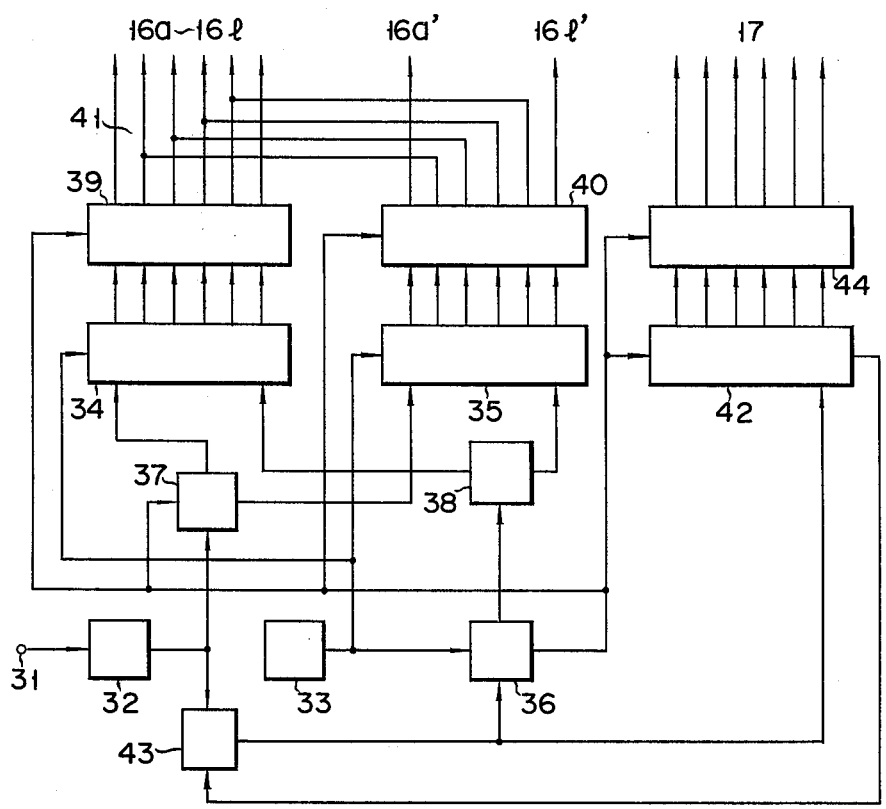
Figure 13:
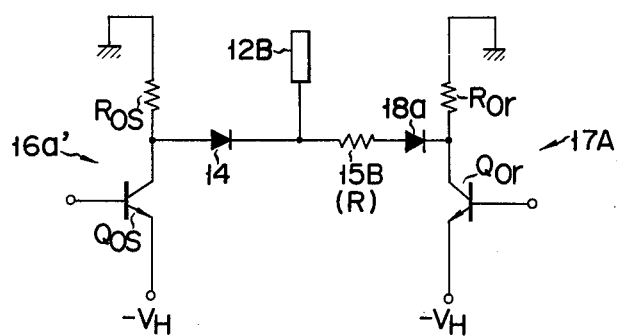
Figure 14:
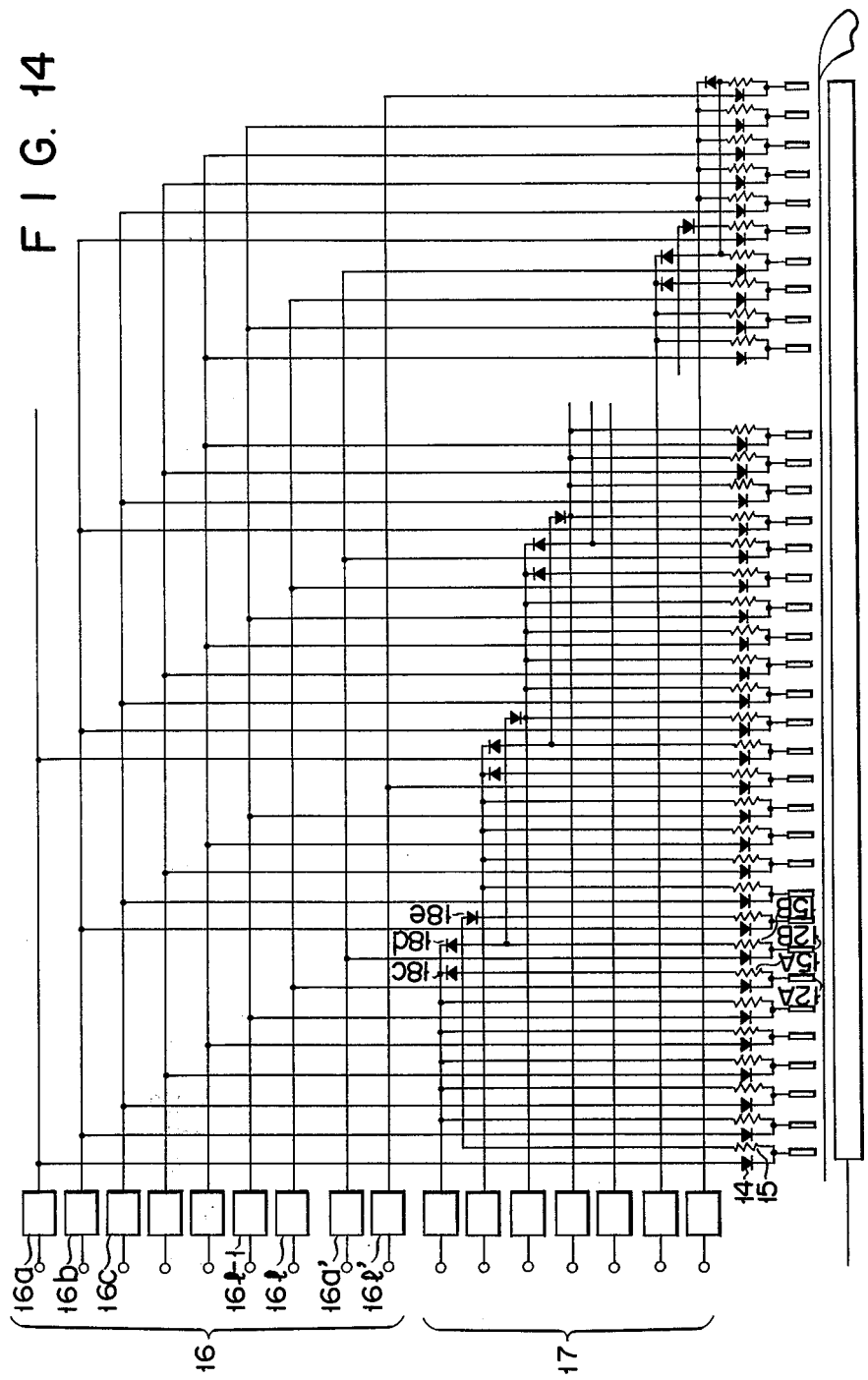
Figure 15:
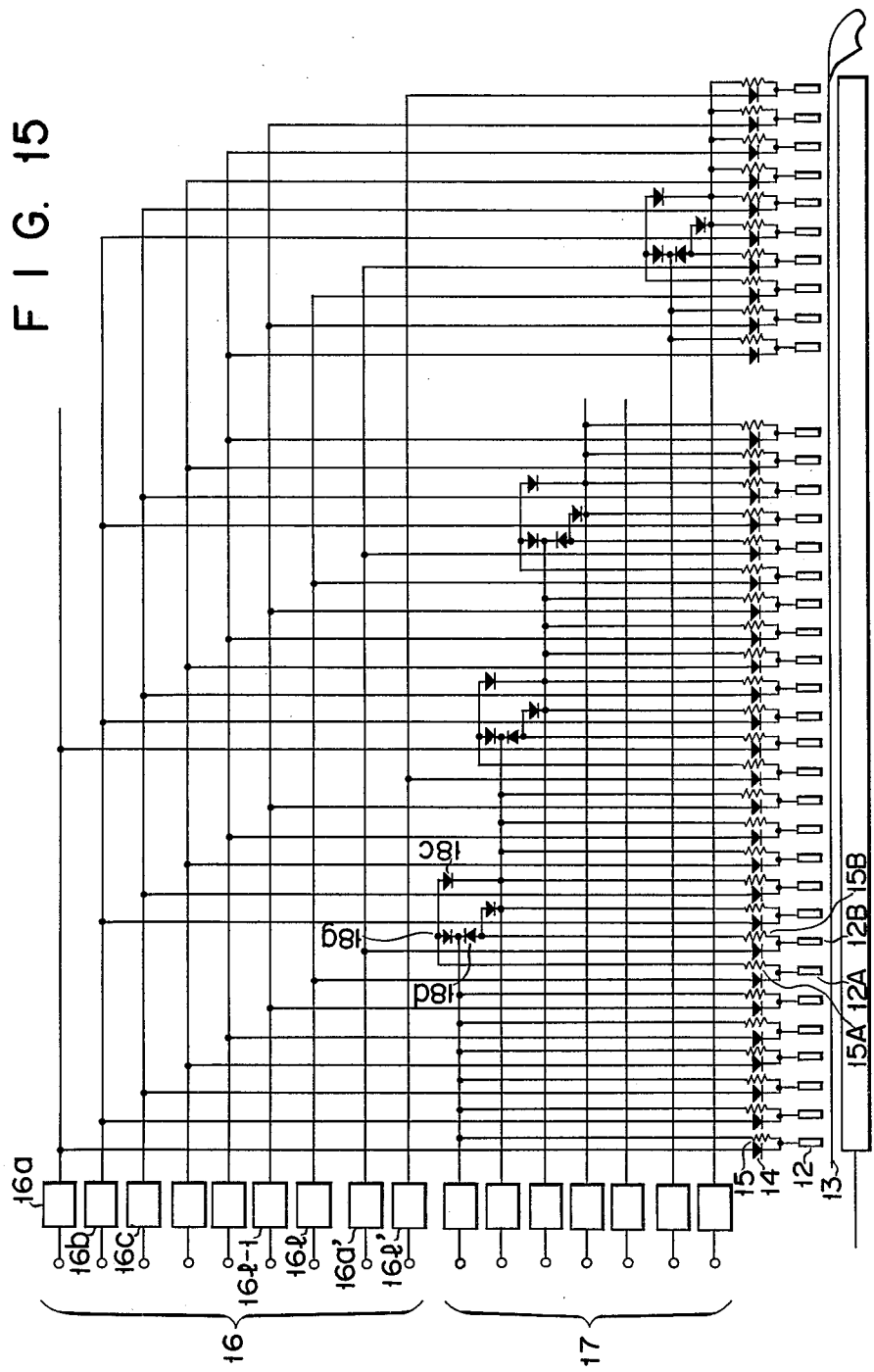
Figure 16:
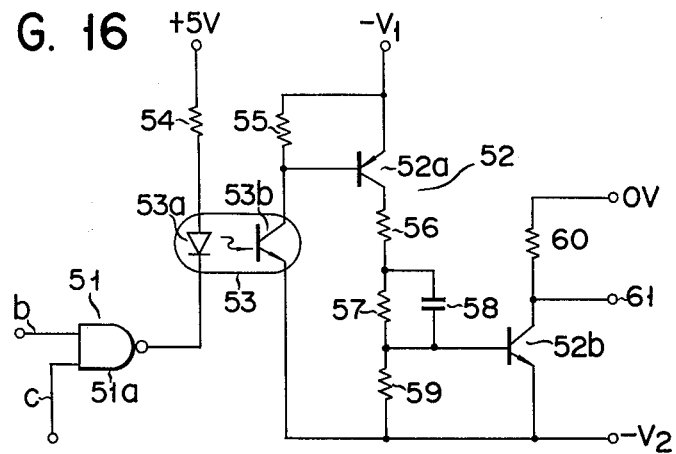
Figure 17:
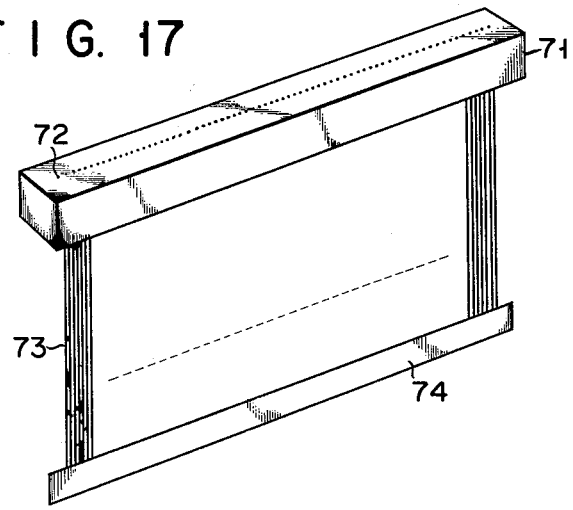
Figure 18:
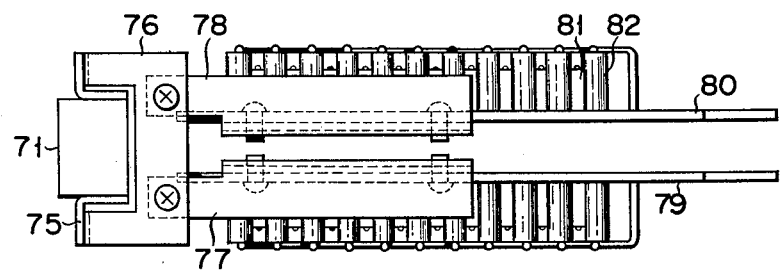
Figure 22:
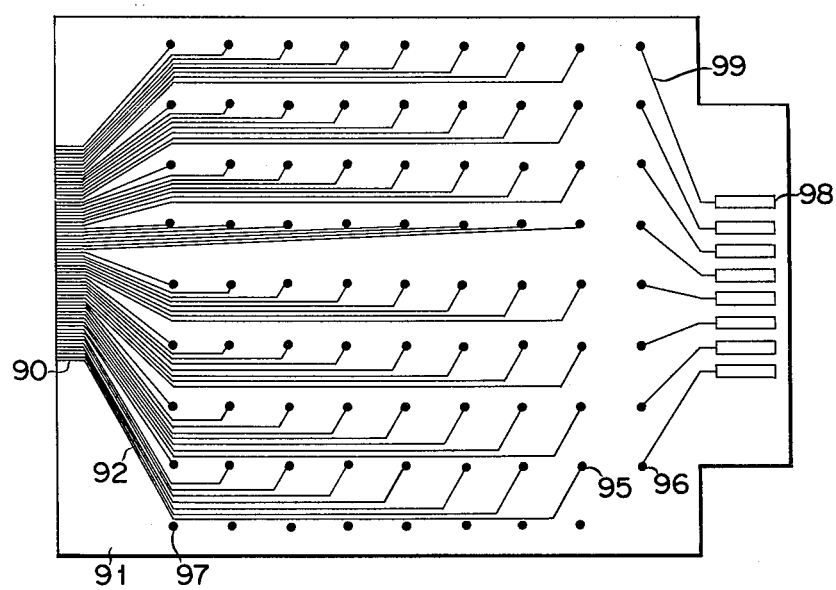
Figure 23:
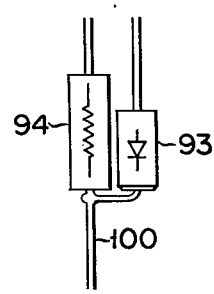
Figure 24:
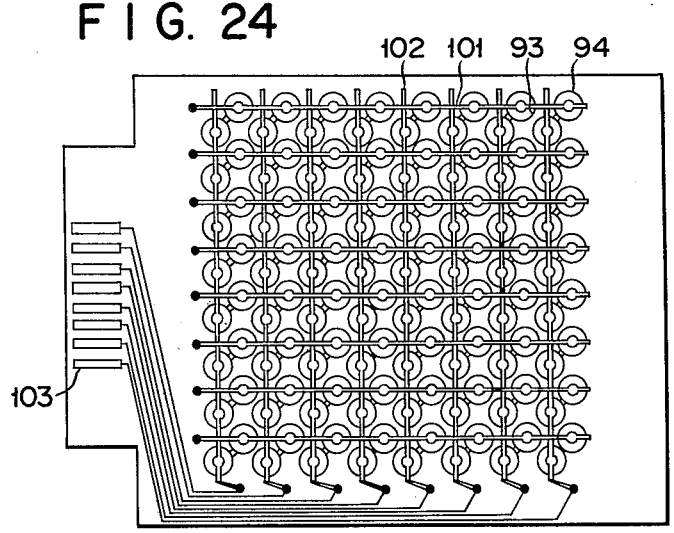

FIGS. 5(a), 5(b), 5(c) and 5(d) show the equivalent circuits of the circuit shown in FIG. 4, (a) illustrating a "selected" condition, (b) illustrating "semi-selected" conditions, and (c) and illustrating a "non-selected" condition;

FIG. 6 is a circuit diagram showing an electrostatic recorder according to another embodiment of the invention;

FIG. 7 is a circuit diagram showing an electrostatic recorder according to another embodiment of the invention, wherein the potential difference between adjacent recording electrodes one of which belongs to one electrode group and the other of which belongs to another is made small;

FIG. 8 is a circuit diagram showing a drive pulse generator corresponding to said adjacent recording electrodes of FIG. 7;

FIG. 9 is a circuit diagram showing an operation circuit for energizing adjacent recording electrodes of a recorder using said drive pulse generator of FIG. 8;

FIG. 10 is a circuit diagram showing an operation circuit based on the modification of an embodiment corresponding to FIG. 9;

FIG. 11 is a circuit diagram showing an electrostatic recorder according to another embodiment of the invention, wherein the potential difference between adjacent recording electrodes is made small using diodes;

FIG. 12 is a block circuit diagram showing an electrostatic recorder for generating pulse signals being supplied to the drive pulse generator of said electrostatic recorder of FIG. 11;

FIG. 13 is a circuit diagram showing an operation circuit for explaining the operation of said electrostatic recorder of FIG. 11;

FIGS. 14 and 15 are circuit diagrams showing electrostatic recorders according to other embodiments of the invention based on FIG. 11;

FIG. 16 is a circuit diagram showing an improved drive pulse generator according to another embodiment;

FIG. 17 is a perspective view of a retainer having recording electrodes embedded therein;

FIG. 18 is a side view of a recording head assembly having recording electrodes, diodes and resistors incorporated therein;

FIG. 19 is a plan view of FIG. 18;

FIG. 20 is a partial side view of a substrate having diodes and resistors incorporated therein;

FIG. 21 is a perspective view of a recording head unit constructed such that the recording head assembly of FIG. 18 is received in a housing;

FIG. 22 is a plan view of a substrate of a recording head assembly based on the application of a print wiring technique;

FIG. 23 is a side view showing a diode and resistor mutually connected at one end; and FIG. 24 is a plan view of an electrode substrate having incorporated therein an assembly of a diode and resistor of FIG. 23.

Figure 1:
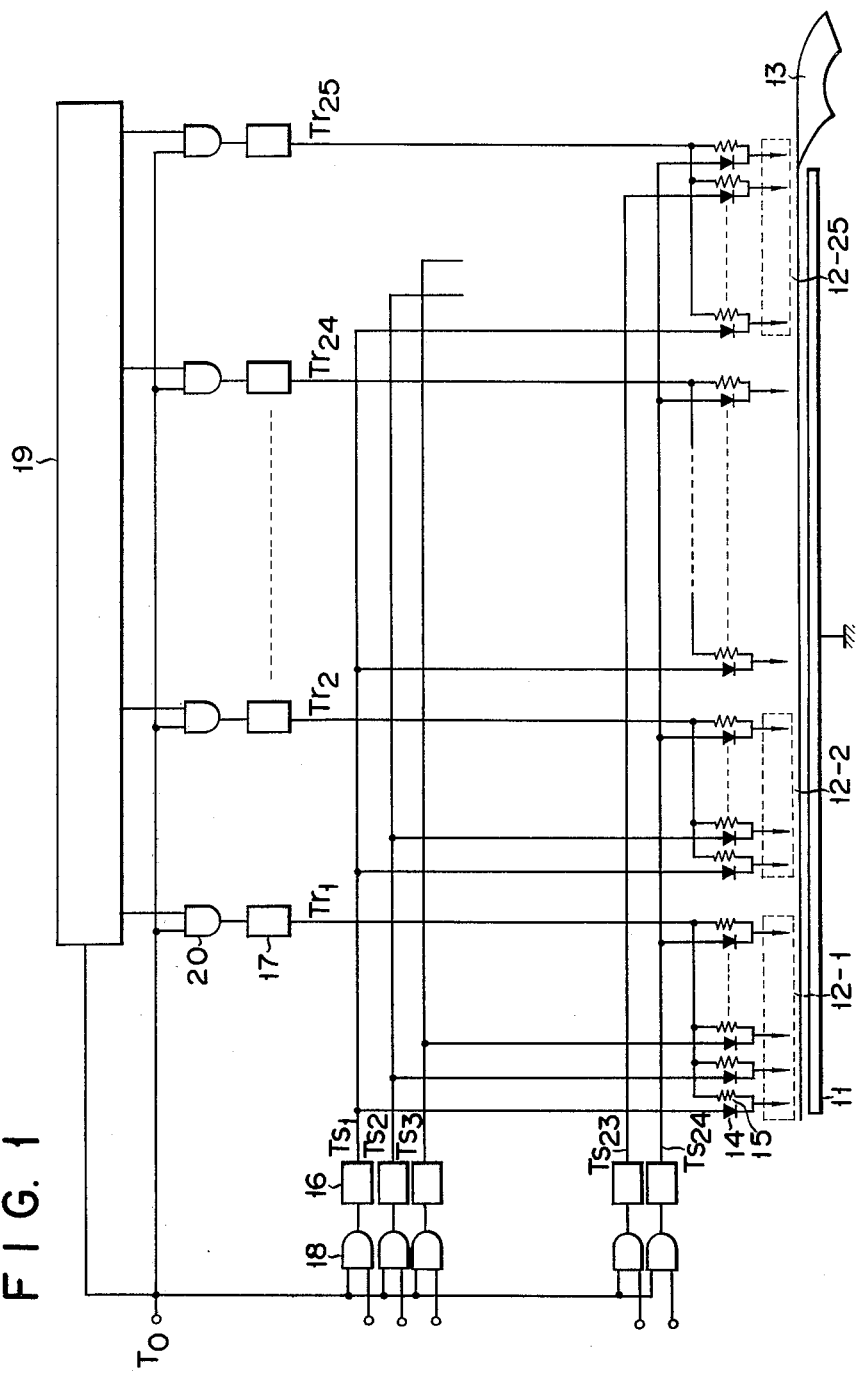
FIG. 1 is a circuit diagram showing an electrostatic recorder according to an embodiment of the invention.

In the embodiment shown in FIG. 1, there are provided a plurality of (for example, 600) needle recording electrodes 12 having tip ends facing a rear electrode 11 closely thereto. Said recording electrodes are embedded in a line in an insulator such as epoxy resin at intervals each ranging from about 0.1 to 0.2 mm with the tip ends exposed. Said electrodes are divided into a plurality of groups, for example, 25 groups, and a prescribed interval is provided between two adjacent groups, and each group consists of 24 electrodes and corresponds to one character. Namely, this invention is so constructed as to print 25 characters at maximum with respect to one line. An electrostatic recording paper 13 travels at a prescribed speed between the rear electrode 11 and the recording electrodes 12 in a state contacting the recording electrodes in a direction intersecting the alignment direction of the recording electrodes 12 at right angles.

To the respective electrodes 12 are connected diodes 14 and resistors 15. The 24 recording electrodes 12 constituting one group are connected to the same number of drive pulse generators 16 via the respective diodes 14, and all electrode groups are connected via the diodes to the drive pulse generators 16 in a mutually corresponding relationship. Said drive pulse generators 16 are respectively connected to the outputs of the same number of AND gates 18, and one side-input terminals of the AND gates respectively receive recording signals while the other side-input terminals receive a clock pulse signal in common.

Second drive pulse generators 17 are provided respectively to correspond to a plurality of electrode groups, i.e., 25 groups, and are respectively connected via the resistors 15 to the 24 recording electrodes 12 of the corresponding group. The input terminals of drive pulse generators 17 are respectively connected to the output terminals of AND gates 20, and one side-input terminals of the AND gates 20 are respectively connected to the plural output terminals of a ring counter 19 while the other side-input terminals of the AND gates 20 receive a clock pulse signal in common. The ring counter 19 generates in turn output pulses from its plural output terminals in synchronization with a clock pulse T0, and when the recording electrodes 12 are energized in accordance with one cycle operation of said ring counter 19, the corresponding electrostatic latent images to one scanning line corresponding to one line consisting of 25 characters at maximum are formed on a recording paper.

The fundamental operation of the electrostatic recorder having the foregoing circuit construction will hereinafter be described. First, corresponding recording signals to one scanning line corresponding to the initial one character of 25 characters constituting one line are supplied to the first drive pulse generators 16 via the respective AND gates 18, and high voltage drive pulses are generated from the first drive pulse generators 16 in such a manner as to correspond to the recording signals. The high voltage drive pulses are supplied via the diodes to the recording electrodes of all electrode groups. At this time, the ring counter 19 generates one output pulse being supplied via the AND gate 20 to the first generator $Tr1$ of the second drive pulse generator, in synchronization with a clock pulse signal. For this reason, the first generator $Tr1$ generates a high voltage pulse, which is supplied via the resistors only to a first electrode group 12-1. Accordingly, the recording electrodes of the first electrode group 12-1 are energized by the high voltage pulse causing the formation of electrostatic latent images on the recording paper 13 and generated upon the operations of both the first drive pulse generators 16 and second drive pulse generators 17. Since, at this time, the recording electrodes of the other electrode groups receive, due to only the first drive pulse generators 16 being operated, voltage pulses not high enough to form electrostatic latent images on the recording paper, no electrostatic latent image is formed on the portions of the recording paper which face them. Next, when recording signals corresponding to part of the next character are supplied to the first drive pulse generators 16 via the AND gates 18 and the ring counter 19 is advanced one count to generate an output pulse for energizing the second drive pulse generator $Tr2$, the recording electrodes of only the second electrode group 12-2 are supplied with high voltage pulses enabling the formation of electrostatic latent images on the recording paper. When, in this manner, the ring counter 19 is sequentially advanced in counts to complete one cycle operation and recording signals corresponding to the individual characters are supplied in turn to the first drive pulse generators 16 via the AND gates 18, corresponding electrostatic latent images to one scanning line corresponding to one line consisting of the 25 characters are formed on the recording paper.

Figure 2:
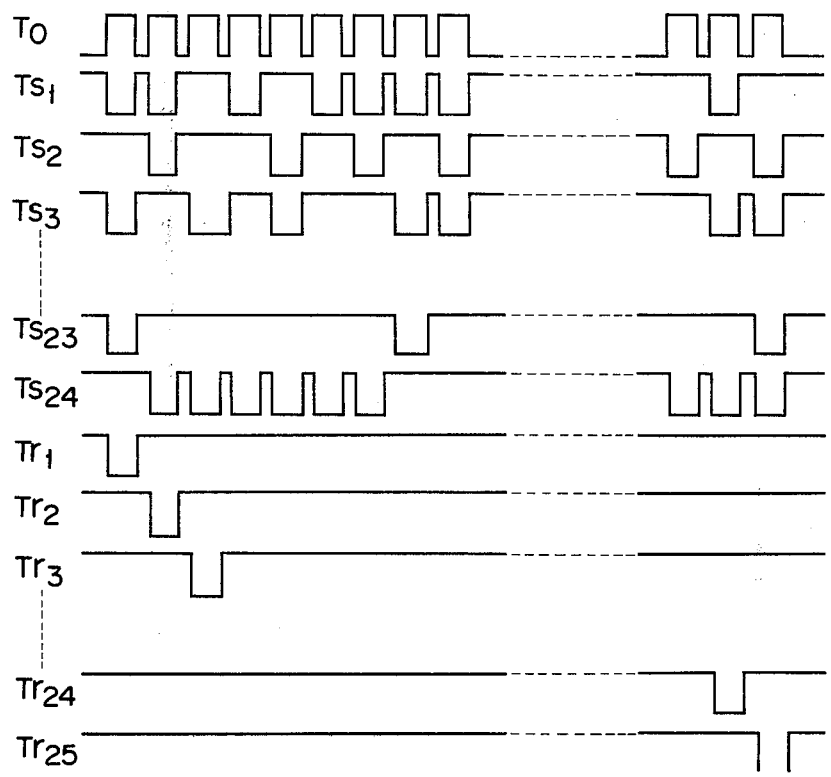
FIG. 2 shows the time charts of pulse signals at the respective portions of the circuit shown in FIG. 1.

By repeating such operation by 24 cycles in the process of allowing the recording paper to travel continuously, electrostatic latent images corresponding to 25 characters at maximum constituting one line are formed on the recording paper. In FIG. 2, for clarification of the operations, there are shown time charts of the respective high voltage pulses generated from the first and second drive pulse generators and those of clock pulses.

Figure 3:
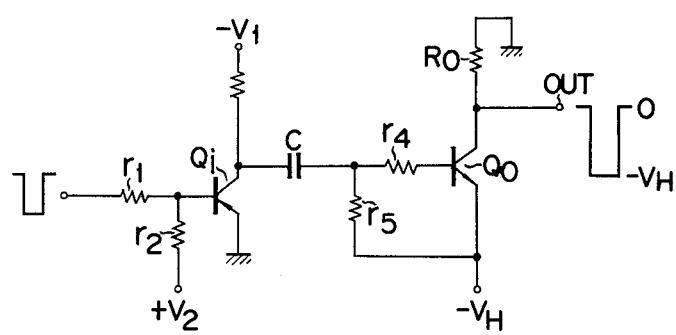
FIG. 3 is a circuit diagram showing a drive pulse generator.

The circuit construction of the first and second drive pulse generators 16 and 17 is shown in FIG. 3. Referring to FIG. 3, the base of a PNP transistor Qi is connected to an input signal source, i.e., the AND gate 18 or 20 via a resistor $r1$ and simultaneously connected to a bias voltage source +V2 via resistor $r2$. The emitter of the transistor Qi is grounded, and the collector thereof is connected to a voltage source $-V1$ via a resistor $r3$ and simultaneously to the base of an NPN transistor QO via a serial circuit of a capacitor C and resistor $r4$. The emitter of the transistor QO is connected to a voltage source $-VH$ and simultaneously connected via a resistor $r5$ to the connection point between the capacitor C and the resistor $r4$, while the collector thereof is grounded via a resistor RO and simultaneously connected to an output terminal OUT.

When a negative input pulse is supplied to the drive pulse generator having the foregoing circuit construction, the transistor Qi is rendered conducting, so that the transistor QO is rendered conducting. As the result, a negative high voltage pulse $-VH$ is generated from the output terminal OUT.

The operation of the recorder using the first and second drive pulse generators having the circuit construction of FIG. 3 will now be described about a single recording electrode 12 by reference to FIGS. 4 and 5.

In FIG. 4, the drive pulse generator is shown only by a circuit consisting of the final stage transistor QO, and the first and second drive pulse generators 16 and 17 are respectively shown by a circuit of a transistor QOs and resistor ROs and a circuit of a transistor QOr and resistor ROr.

Where the transistors QOs and QIr are both rendered conducting, namely where recording signals and the output signals from the counter 19 are respectively supplied to the first and second drive pulse generators 16 and 17, the recorder is brought to a state shown by an equivalent circuit (a) of FIG. 5. That is, no current is passed through the diode 14, which accordingly is rendered substantially non-conducting. As the result, a voltage $-VH$ is supplied to the recording electrode 12 via a resistor 15. In this case, a voltage VCE impressed on the transistor QOr is overlooked because it has an extremely small value as compared with the value ($-500V$ to $-800V$) of the voltage $-VH$. At this time, an electrostatic latent image is formed on the recording paper 13. This condition is referred to as a selected condition.

Where the transistor QOs is rendered nonconducting and the transistor QOr is rendered conducting, the recorder is brought to a state shown by an equivalent circuit (b) of FIG. 5, so that the diode 14 is rendered conducting. As the result, current is passed through the resistor ROs, diode 14, resistor 15 and transistor QOr in the order mentioned, and the recording electrode 12 is supplied with a voltage having a value equal to $VH \cdot ROs/(ROs + R)$ (where R represents the resistance value of the resistor 15). This voltage is chosen to have a voltage value, ranging, for example, from $-250$ to $-350V$, smaller than the minimum value of a voltage necessary for the electrostatic recording, and the voltage value is obtained by setting the respective values of the resistor ROs and the resistor 15 (namely, R). Under this condition, namely, under the condition of the equivalent circuit (b), a voltage appears at the recording electrode, but the electrostatic recording is not effected. This condition is referred to as a semi-selected condition.

Where the transistor QOs is rendered conducting and the transistor QOr is rendered nonconducting, the recorder is brought to the condition of an equivalent circuit (c). At this time, the diode 14 is substantially rendered nonconducting, so that the recording electrode 12 has an earth potential. Further, where the transistors QOs and QOr are both rendered nonconducting, the recorder is brought to the condition of an equivalent circuit (d). At this time, the recording electrode 12 has an earth potential as in the case where the recorder is kept in the condition of the equivalent circuit (c). Under the conditions (c) and (d), the recording electrode 12 is not supplied with any high voltage pulse, so that the electrostatic recording is not effected. This condition is referred to as a non-selected condition.

As above described, by permitting the recording electrodes to be all set to the selected, semi-selected or non-selected condition, electrostatic latent images corresponding to a prescribed character are formed on the recording paper. Since, in this manner, the high voltage is divided by the respective resistances provided in the drive pulse generator to be brought to a semi-selected condition, the potential difference between the selected and non-selected conditions is not produced between any two adjacent recording electrodes, so that the life of the recording needle can be extended.

In the embodiment shown in FIG. 6, the input terminals of the first drive pulse generators 16 are respectively connected to the input terminals of an OR gate 21, and the output of the OR gate is supplied to the additional input terminals of the AND gates 20 connected to the second drive pulse generators 17. With the above-mentioned circuit construction, where recording signals are absent on a given scanning line corresponding to characters to be recorded, for example, where a portion corresponding to a space between character lines is considered, even if outputs are generated from the counter 19, no output will be generated from the AND gate 20 because no output is generated from the OR gate 21, so that the second drive pulse generator 17 is not energized. Accordingly, power to be consumed by the second drive pulse generator can be economized.

With respect to two adjacent recording electrodes, one belonging to one electrode group of the aforesaid electrostatic recorder and the other belonging to another, said one recording electrode often has a recording potential and said other often has an earth potential, so that the potential difference therebetween often becomes great. For this reason, a sufficient insulation should be applied between said both recording electrodes. Since, in a recorder for recording characters only, a somewhat large interval corresponding to a character-to-character interval is provided between electrode groups, the above-mentioned insulation is sufficiently attained. However, in such a recorder, used in, for example, a facsimile apparatus, as records signals for an image including a continuous line, no sufficiently large interval can be provided between the electrode groups which raises the above-mentioned insulation problems.

In FIG. 7, an embodiment wherein the above points are taken into consideration is shown. In this embodiment, the connection relationship of the first and second drive pulse generators 16 and 17 with the recording electrode 12 is the same as that described in the preceding embodiment.

In said embodiment, the first drive pulse generators 16A and 16B respectively corresponding to the two adjacent recording electrodes 12A and 12B and the second drive pulse generators 17A and 17B respectively corresponding thereto are constructed as shown in FIG. 8. A circuit shown in FIG. 8 is substantially the same as that shown in FIG. 3. In the circuit of FIG. 8, however, the collector of the transistor QOr is connected via the resistor ROr to a voltage source −VL having a semi-selected voltage, namely a voltage level of, for example, −200 to −300V. When, in this manner the collector of the transistor QOr is connected to the semi-selected voltage source, the recording electrode 12A or 12B is supplied with a semi-selected voltage −VL even in the case where both transistors QOs and QOr are rendered nonconducting as apparent from FIG. 9. This means that the recording electrodes 12A and 12B do not have a non-selected potential of less than −VL. Accordingly, a potential difference of VH − VL is only produced between the electrodes at most, so that even if an interval between said both electrodes 12A and 12B is made small, creeping discharge will not take place between both electrodes.

The recorder according to this embodiment is constructed such that the first drive pulse generators 16A and 16B and the second drive pulse generators 17A and 17B are connected to the voltage source −VL, but may be constructed such that, as shown in FIG. 10, the second drive pulse generators 17 are connected to the voltage source −VL and the first drive pulse generators 16 are grounded.

In the embodiment shown in FIG. 11 there is provided an electrostatic recorder designed to have the same effect as that attainable by the embodiment of FIG. 7. In said embodiment, the adjacent electrodes 12A and 12B are respectively connected to the individual drive pulse generators 17 via a serial circuit of a resistor 15 and a diode 18a and via a serial circuit of another resistor 15 and a diode 18b, and the connection point between a resistor 15a and the diode 18a is connected to the connection point between a resistor 15b and the diode 18b. The first drive pulse generators 16 include the first drive pulse generators 16a and 16l respectively corresponding to the recording electrodes 12B and 12A at the respective both ends of the electrode groups bearing the orders of odd numbers and the first drive pulse generators 16a' and 16l' respectively corresponding to the recording electrodes 12B and 12A at the respective both ends of the electrode groups bearing the orders of even numbers. The remaining recording electrodes of the respective electrode groups respectively correspond to the first drive pulse generators 16b to 16l−1.

With the foregoing circuit construction, recording signals are alternately supplied to the first drive pulse generators 16a and 16l respectively corresponding to the recording electrodes at the respective both ends of the electrode groups bearing the orders of odd numbers, or to the first drive pulse generators 16a' and 16l' respectively corresponding to the recording electrodes at the respective both ends of the electrode groups of even numbers, and continuously supplied in turn to the remaining drive pulse generators 16b to 16l−1. Further, each of the drive pulse generators 17 is so constructed as to supply a second drive pulse signal to one of the recording electrode groups of the system including the drive pulse generators 16a and 16l (or 16a' and 16l') driven by recording signals.

In FIG. 12 a circuit for generating pulse signals supplied to the drive pulse generator groups 16 and 17 shown in FIG. 11 is shown.

Recording signals supplied to an input terminal 31 are supplied to a wave shaping circuit 32 constituted by, for example, a Schmitt circuit and converted there into binary signals. The recording signals are accumulated in either of two registers (each having $l$ bits) 34 and 35 in synchronization with clock signals from a clock pulse generator 33 constituted by a quartz oscillator and frequency divider. The recording signals passed through the wave shaping circuit 32 are alternately supplied to the registers 34 and 35 for every $l$ number of cycles of clock signals via a gate circuit 37 controlled by the output of an $l$-scale counter 36 for counting clock signals, and are accumulated therein. At this time, the resistor 34 or 35 supplied with no recording signals is reset by the output of the $l$-scale counter 36 passed through a gate circuit 38.

In this manner, recording signals are accumulated in the registers 34 and 35 in synchronization with clock signals, and thereafter are respectively supplied to gate circuits 39 and 40 having an $l$ number of gates. When recording signals of an $l$ number of bits are accumulated in the shift registers 34 and 35 respectively corresponding to the gate circuits 39 and 40, the counter 36 generates output pulses each having a pulse width corresponding to a predetermined length of recording time. By the output pulses, the gate circuits 39 and 40 are controlled simultaneously to generate negative-going pulses corresponding to the recording signals. The negative-going pulses are respectively supplied to a group of the first drive pulse generators 16a to 16l, 16a' and 16l'.

A ring counter 42 has its content shifted bit by bit in response to outputs from the counter 36, and one full circulation of the shifting operation of the ring counter corresponds to one scanning line. In the ring counter 42, the phase of a signal corresponding to a scanning line and the position of this scanning line are controlled by outputs from a phase comparator 43 for comparing an output from the counter 42 with a phase signal separated from a recording signal passed through the wave shaping circuit 32. An output from the ring counter 42 is so controlled as to have a pulse width corresponding to a predetermined length of recording time by a gate circuit 44 operated in response to outputs from the counter 36, and then supplied to the second drive pulse generators 17 with a prescribed timing.

Let it be now assumed that, for example, the first drive pulse generators 16a to 16l and the second drive pulse generator 17A generate high voltage pulses in accordance with signals from the gate circuits 39, 40 and 44. Then, some of the recording electrodes 12 constituting the electrode group 12-1 are so energized as to have a prescribed lever −VH of recording voltage, thereby causing the formation of electrostatic latent images on the recording paper 13. At this time, one end of the resistor 15B having the other end connected to the electrode 12B of the adjacent electrode group has a potential of −VH due to the action of the diode 18a. Under this condition, the electrode 12B is supplied with a voltage of $VH \cdot ROs/(ROs + R)$, i.e., a semi-selected voltage. Accordingly, the potential difference between the recording electrodes 12A and 12B is made as small as $VH − VH \cdot ROs/(ROs + R)$ at maximum.

Since, at this time, the remaining electrodes of the adjacent electrode group 12-2 to the electrode group 12-1 kept in a selected condition are all made to have an earth potential, the potential difference between the electrode 12B of the electrode group 12-2 and the same group electrode adjacent the electrode 12B is $VH \cdot ROs/(ROs + R)$. Therefore, no creeping discharge takes place between these electrodes.

As above described, the embodiment shown in FIG. 11 wherein the first drive pulse generators of the group 16 have the same circuit construction can attain the same effect as that obtainable by the embodiment shown in FIG. 7.

Further, in the embodiment of FIG. 11, diodes may be provided in such a connection relationship as is shown in the respective embodiments of FIGS. 14 and 15.

As apparent from the preceding embodiments, according to the invention, the potential difference between the recording electrodes is rendered in principle equal to the difference between the selected voltage and semi-selected voltage. This difference accounts for 50 to 70 percent of the potential difference attainable in the prior art electrostatic recorder. The interval between the recording electrodes can be made small to an extent corresponding to this decrement of potential difference, so that the resolution is improved to enable the reproduction of a good quality image. Further, if the interval between the recording electrodes is rendered equal to that defined in the case of the prior art recorder, the discharging between the recording electrodes will be effected to a reduced extent, so that the waste of the recording electrode is decreased to elongate the life of the electrostatic recorder.

In FIG. 16, a high voltage pulse generator, i.e., a drive pulse generator is concretely shown. Referring to FIG. 16, a control circuit 51 is optically coupled to a high voltage output circuit 52 by an optically coupling circuit 53, and a high voltage pulse is generated from the high voltage output circuit 52 in response to input signals applied to the control circuit 51. That is to say, the optically coupling circuit 53 is constituted by a light emission diode 53a and a photo-transistor 53b which are disposed to face each other, and an insulation treatment is given between the diode 53a and the photo-transistor 53b so as to permit an insulation withstand voltage of 1 to 2KV to be obtained therebetween. The anode of the light emission diode 53a is connected via a resistor 54 to a source for a low voltage logic circuit, for example, a source having a voltage level of +5V, while the cathode thereof is connected to the output terminal of a NAND circuit 51a, which is supplied with a recording signal b and a clock pulse c. The collector of the photo-transistor 53b is impressed with a negative potential −V1 via a resistor 55 while the emitter thereof with a negative potential −V2 lower than the negative potential −V1. The collector of the photo-transistor 53b is connected to the base of an NPN transistor 52a. The emitter of the transistor 52a is impressed with a negative potential −V1 while the collector thereof is connected to the base of a transistor 52b via a serial circuit consiting of a resistor 56 and a parallel circuit of a resistor 57 and a capacitor 58. The base of the transistor 52b is impressed with the negative potential −V2 via a resistor 59 while the emitter thereof directly with the negative potential −V2. Further, the collector of the transistor 52b is grounded via a resistor 60 and connected directly to an output terminal 61.

Where, in the aforesaid circuit construction, either of the control signal b and the clock pulse c has a level of "0", the output of the NAND circuit 51a has a level of "1" (high level), so that the light emission from the diode 53a is not effected. Accordingly, the photo-transistor 53b is rendered nonconducting, thereby rendering the transistor 52a nonconducting, so that the transistor 52b is rendered non-conducting. For this reason, the output terminal 61 is supplied via the resistor 60 with a voltage of 0V.

Where both of the control signal b and the clock pulse c have a level of 1, the output of the NAND circuit 51a has a level of 0 (low level), so that current is flowed in the light emission diode 53a via the resistor 14. Therefore, the light emission from the diode 53a is effected to render the transistor 53b conducting, so that the transistor 52a is rendered conducting to render the transistor 52b conducting. For this reason, the output terminal 61 is supplied with a voltage of −V2.

When the light emission from the diode 53a is not effected, the use of the above-mentioned drive pulse generator renders all of the transistors 53b, 52a and 52b non-conducting to prevent current from being consumed for nothing. Further, by determining the pulse width of the clock pulse c as desired, the pulse width of a negative voltage pulse appearing at the output terminal 61 can be so set as to have a predetermined value.

Though, where the electrostatic recorder having the foregoing circuit construction is formed by assembling the resistors, diodes and needle electrodes, the assembling operation is supposed to become complicated, the following construction enables a considerably easy performance of said assembling operation.

As shown in FIG. 17, a plurality of recording electrodes 72 are so embedded in an angular electrode retainer 71 as to cause the tip ends thereof to be exposed. Integrally connected to the recording electrodes 72 are lead wires 73, the opposite ends of which are respectively fixed by an adhering tape 74.

As shown in FIGS. 18 and 19, two L-shaped fittings 75 are attached to the side portions of the electrode retainer 71. Mounted onto the L-shaped fittings 75 are U-shaped fittings 76 to which are attached hinges 77 and 78. The respective wiring substrates 79 and 80 are provided for the hinges so as to face each other with the lead wires interposed therebetween. Thus, the substrates can be swung through an angle of 90° by the hinges. Attached to the substrates 79 and 80 are diodes 81 and resistors 82 (respectively corresponding to the diodes 14 and resistors 15 of FIG. 1) which are subjected to wiring with lead wires 83 and 84 as shown in, for example, FIG. 1. The terminating ends of the lead wires 83 and 84 are connected to connectors 85 provided for one side end of the substrate 79 (and 80). The connectors 85 are connected to the above-mentioned first and second drive pulse generators. In said wiring operation, one side-ends of the diode 81 and resistor 82 are mutually connected by means of a connection member 86, and the lead wires 83 and 84 are respectively connected to the diode and the resistor so as to prevent the lead wires 83 and 84 from contacting each other, by utilizing the difference in height between the diode and the resistor.

In forming the above-mentioned recording electrode head assembly, the diode 81 and resistor 82 are beforehand attached to the substrates 70 and 80, which are also attached to the hinges 77 and 78. With the substrates 79 and 80 maintained swung through an angle of 90°, the lead wires 73 are connected one by one to the connection members 86 in a predetermined order. After completion of this wiring operation, the substrates 79 and 80 are made parallel with each other and then fixed. Thereafter, the head assembly is so received in a housing as to permit the connectors 85 and the recording head assembly to project from the housing.

The embodiment shown in FIGS. 17 to 20 refers to the case where the fine wire-made recording electrodes are embedded in the electrode retainer, but these electrodes may be formed on an insulation substrate by utilizing a print-wiring technique. Namely, 500 to 2000 hard soldering-applied and copper foil-made recording electrodes 90 are formed on one surface of an epoxy resin-made substrate 91 having a thickness of 1.0 mm at the rate of 3 to 8 electrodes per millimeter by utilizing the etching technique. Similarly, lead wires 92 for supplying a pulse voltage of −600 to −800V to recording electrodes 90 are formed on the substrate 91 in a state divided into some groups. One side-ends of the lead wires 92 are respectively connected to the recording electrodes 90 while the other side-ends are connected to lands 95 to each of which is connected a connection point between the diode 93 and the resistor 94. These lead wires respectively have substantially the same width as that of the recording electrode 90, and are respectively formed of copper foil. If it is assumed in this embodiment that eight recording electrodes be provided with respect to one character and eight characters be recorded with respect to one row, the lands 95 having the recording electrodes 90 connected thereto for each group will be arranged by the number of 8 rows × 8 columns. Further, one row- and one column-lands 96 and 97 are provided respectively in addition to the eight rows and eight columns. The lands 96 are respectively connected via lead wires 99 to connector terminals 98 provided on the substrate 91.

On the other hand, the diode 93 and the resistor 94 are mutually connected at one end, as shown in FIG. 23. A lead wire 100 drawn from the common connection point is connected to the land 95, and the resistors and diodes are thus attached to the substrate 91. The diodes 93 attached to the substrate 91 are connected at the other end in common for each electrode group by means of lead wires 101. Similarly, the resistors 94 are connected at the other end in common for each electrode group by means of lead wires 102. The lead wires 101 are respectively connected to the lands 97 while the lead wires 102 are respectively connected to the lands 96. On the corresponding back surface of the substrate surface in which the connectors are formed are formed other connectors 103, which are respectively connected to the lands 97.

The recording electrode head assembly constructed as described above can be connected to the first and second drive pulse generators by connecting to a socket the end of the substrate on which are formed the connectors 98 and 103.

With the above-mentioned construction, the recording electrode head assembly can be made compact and low in manufacturing cost, and readily fabricated.

What we claim is:

1. An electrostatic recorder comprising:

a plurality of recording electrodes aligned in a line at prescribed intervals and divided into a plurality of electrode groups;

a plurality of series members each comprising a diode and main resistor connected in series and having a common connection point connected to one of said recording electrodes;

a plurality of first drive pulse generators each having an output terminal connected to a given one of the recording electrodes included in each of said plurality of electrode groups via the diode and operated in response to recording signals to generate high voltage pulses;

a plurality of second drive pulse generators each of which has an output terminal connected via the main resistor to the recording electrodes included in the corresponding one of said electrode groups and which are sequentially operated in response to control signals to generate high voltage pulses;

said first and second drive pulse generators each having an additional resistor connected between its output terminal and a point having a predetermined potential;

a rear electrode provided in common for the plurality of electrode groups;

the resistance ratio of the main and additional resistors having a value permitting a semi-selected voltage of 50 to 70 percent of a recordable voltage to be applied to the recording electrodes corresponding to non-actuated first drive pulse generators belonging to the recording electrode group corresponding to an actuated second drive pulse generator.

2. An electrostatic recorder according to claim 1 which further comprises a ring counter having a plurality of output terminals for generating said control signals from said terminals and wherein said second drive pulse generators are respectively electrically coupled to said output terminals of said ring counter.

3. An electrostatic recorder according to claim 2 wherein said ring counter generates sequentially said control signals in response to clock pulses and said second pulse generators are respectively coupled to said output terminals of said ring counter via respective gate circuits receiving the corresponding control signals and clock pulses.

4. An electrostatic recorder according to claim 1 wherein a gate circuit having a plurality of input terminals respectively connected to the inputs of said first drive pulse generators is provided to permit said second drive pulse generators to generate high voltage pulses in response to an output from said gate circuit and said control signal.

5. An electrostatic recorder according to claim 1 wherein said additional resistor is connected between the output terminal of the pulse generator and a point having an earth potential.

6. An electrostatic recorder according to claim 1 wherein the additional resistor of each of said first drive pulse generators respectively corresponding to two adjacent recording electrodes, one of which belongs to one of the two adjacent electrode groups and the other of which belongs to the other, includes one end connected to the output terminal of the pulse generator and the other end supplied with a predetermined potential having a voltage level disabling the electrostatic recording from being effected.

7. An electrostatic recorder according to claim 1 wherein any two adjacent recording electrodes of each of said electrode groups are aligned in a line at a first interval and any two adjacent recording electrodes between any two adjacent recording groups are aligned at a second interval larger than said first interval.

8. An electrostatic recorder according to claim 1 wherein any two adjacent recording electrodes of all said electrode groups are aligned in a line at the same interval.

9. An electrostatic recorder according to claim 1 wherein said first drive pulse generators corresponding to the recording electrodes at the respective both ends of the recording electrodes included in each of the electrode groups bearing the orders of odd numbers of said electrode groups and said first drive pulse generators corresponding to the recording electrodes at the respective both ends of the recording electrodes included in each of the electrode groups bearing the orders of even numbers generate alternately high voltage pulses; any two adjacent recording electrodes, one of which belongs to one of said two adjacent electrode groups and the other of which belongs to the other, are connected to the corresponding second drive pulse generators via additional diodes connected between said resistors and said corresponding second drive pulse generators; and the connection points between said additional diodes corresponding to said two adjacent recording electrodes and the corresponding resistors connected to said diodes are mutually connected.

10. An electrostatic recorder according to claim 1 wherein said diodes and resistors are disposed on two wiring boards and are assembled in an electrode holder for holding said recording electrodes, said two wiring boards being fixed in a mutually faced condition.

11. An electrostatic recorder according to claim 1 wherein each of said first and second drive pulse generators comprises an optically coupling circuit comprising a light emission diode and a light receiving phototransistor, a control circuit for controlling the light emission operation of said light emission diode, and a circuit provided with a high withstand voltage transistor turned on or off in corresponding relationship to the on or off operation of said light receiving photo-transistor to generate high voltage pulse signals.

* * * * *